United States Patent

[11] 3,615,460

| [72] | Inventor | Howard G. Lange |
| | | Arlington Heights, Ill. |
| [21] | Appl. No. | 773,831 |
| [22] | Filed | Nov. 6, 1968 |
| [45] | Patented | Oct. 26, 1971 |
| [73] | Assignee | Zenith Radio Corporation |

[54] METHOD OF FORMING A BLACK SURROUND SCREEN
7 Claims, 4 Drawing Figs.

[52] U.S. Cl. .................................................. 96/36.1,
96/29, 96/36, 96/45.1, 313/109, 117/33.5
[51] Int. Cl. ...................................................... H01j 1/54,
H01j 9/22
[50] Field of Search ........................................... 96/36, 36.1,
29, 45.1; 117/33.5; 313/109

[56] References Cited
UNITED STATES PATENTS

| 2,840,470 | 6/1958 | Levine | 96/36.1 |
| 2,992,919 | 7/1961 | Beeler | 96/36.1 |
| 3,146,368 | 8/1964 | Fiore | 96/36.1 |
| 3,317,319 | 5/1967 | Mayaud | 96/36.1 |
| 3,330,682 | 7/1967 | Tamura | 117/33.5 |
| 3,365,292 | 1/1968 | Fiore | 96/36 |

Primary Examiner—William D. Martin
Assistant Examiner—William R. Trenor
Attorney—Francis W. Crotty ABSTRACT: The screen of a shadow mask type of tricolor picture tube is coated with a light-absorbing layer comprising a composition of a black inorganic pigment material, an acrylic binder and a solvent therefor, specifically toluene. After drying, this layer is overcoated with polyvinyl alcohol and dichromate in water as a solvent and the overcoat is exposed by ultraviolet light, leaving unexposed elemental areas of dot shape. The overcoat is treated with water which removes the unexposed portions and uncovers the corresponding portions of the light-absorbing coating and these portions of the last-mentioned coating are removed by treating with toluene. As a result, elemental dot areas of the screen, which are assigned to one of three phosphor materials, are now laid bare. The exposed elemental portions of the polyvinyl alcohol coating are stripped and all the process steps, except for forming the light-absorbing layer, are repeated two more times, preparing additional elemental screen areas to receive phosphor deposits. The three phosphor materials are then applied in conventional manner.

Inventor
Howard G. Lange
By Francis W. Crotty
Attorney

METHOD OF FORMING A BLACK SURROUND SCREEN

BACKGROUND OF THE INVENTION

The invention is directed to a method of forming a screen of a color image reproducing device in which a multiplicity of sets of deposits of different phosphor materials are separated from one another by deposits of light-absorbing material. Such a screen has come to be known as a "black surround" screen simply because the light-absorbing material is a black pigment which surrounds the groups of sets of elemental phosphor deposits. An image reproducer, specifically a tricolor cathode-ray tube of the shadow mask type having phosphor dot triads distributed over the screen with a black material surrounding each phosphor dot, is described and claimed in U.S. Pat. No. 3,146,368 issued Aug. 25, 1964 in the name of Joseph P. Fiore et al. This patent discloses methods of applying the black pigment and other methods of applying it are the subject of U.S. Pat. No. 3,365,292 issued Jan. 23, 1968 to the same inventors. Both of these patents are assigned to the assignee of the present invention.

One especially attractive attribute of a black surround screen is that it materially enhances or extends the contrast range of the image reproducer for the simple reason that it gives a more true value of black than is achieved with conventional screens not having black surround. Another most attractive advantage is that the black surround obviates the need of tinting the implosion plate frequently positioned in front of the image screen. Tinting of that plate in prior devices is resorted to for the purpose of extending the contrast range and protects against ambient light which may strike the screen and deteriorate the quality of the image. Since both of these results are attained with black surround, the filter aspect of the implosion plate may be dropped which increases the brightness of the image.

The present invention has to do with a specific method of preparing a black surround screen.

Accordingly, it is an object of the invention to provide a novel method of forming a black surround screen for a color image reproducer such as a tricolor shadow mask cathode-ray tube.

It is another specific object of the invention to provide a novel method of forming a black surround screen in which the step of applying phosphor material is assigned elemental areas of the screen is less critical than in certain prior art processes.

SUMMARY OF THE INVENTION

In forming a black surround screen in accordance with the present invention, the screen is first coated with a removable layer of material having light-absorbing capabilities and thereafter a photosensitive material, which may be rendered insoluble in a particular solvent in response to exposure to actinic energy, is applied over the light-absorbing layer. The photosensitive layer is exposed by a source of actinic energy positioned to simulate the electron gun assigned to excite a particular one of the phosphor materials to be applied to the screen. The screen is then treated with the aforesaid solvent which removes the unexposed portions of the photosensitive layer and uncovers portions of the light-absorbing layer that overlie the elemental areas of the screen assigned to the aforesaid particular phosphor. Next the screen is treated to remove the uncovered portions of the light-absorbing layer after which the exposed portions of the photosensitive layer are stripped from the screen. At this juncture, the screen exhibits a light-absorbing layer which is discontinuous to the extent that material of this layer has been removed from spaced elemental areas of the screen assigned to one phosphor material. Repeating this same process two more times, except for forming the light-absorbing layer, adds two additional sets of openings in the light-absorbing layer and exposes elemental areas of the screen that are to receive the remaining two phosphor materials. The screen is now processed in any conventional way to the end that different phosphor materials are applied to the various sets of exposed elemental screen areas.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

DESCRIPTION OF THE PREFERRED EMBODIMENTS

In describing the screening process, it will be assumed that the screen under consideration is for a tricolor shadow mask cathode-ray tube in which the phosphor deposits are small dots. As a general proposition, a color tube screen has a multiplicity of interleaved sets of deposits of different phosphor materials that may either be in the form of dots that are interleaved to define triads over the image screen or that may be stripes individually extending across the screen and arranged in an interlaced repeating pattern. For convenience, the dot triad structure will be described.

The screening process of the invention, assuming that the faceplate of the tube shall have been chemically cleaned, comprises as a first step coating the internal surface of the screen 10 with a removable layer 11 of material having light-absorbing capability. That is to say, this layer may contain a black inorganic pigment to absorb ambient light or initially it may comprise an inorganic material which, when subjected to heat or some other treatment, is converted to a light-absorbing pigment. For example, and as described in U.S. Pat. No. 3,365,292, the layer may initially include manganous carbonate which converts, when the screen under process is subjected to the ordinary high bakeout temperature, to manganese dioxide which is light absorbing. Of course, it is necessary to include a binder to affix the inorganic pigment to the surface of faceplate 10 and it is found that an acrylic binder soluble in toluene, such as B-66 marketed by Rohm and Hass, is suitable. Accordingly, the light-absorbing layer 11 includes as ingredients an inorganic pigment, and a binder which is in solution with a solvent. Since this coating is retained in place by a binder which is soluble in a solvent, the layer is removable in that treating the layer, or selected portions thereof, with the solvent permits removing parts thereof.

Figure 1:
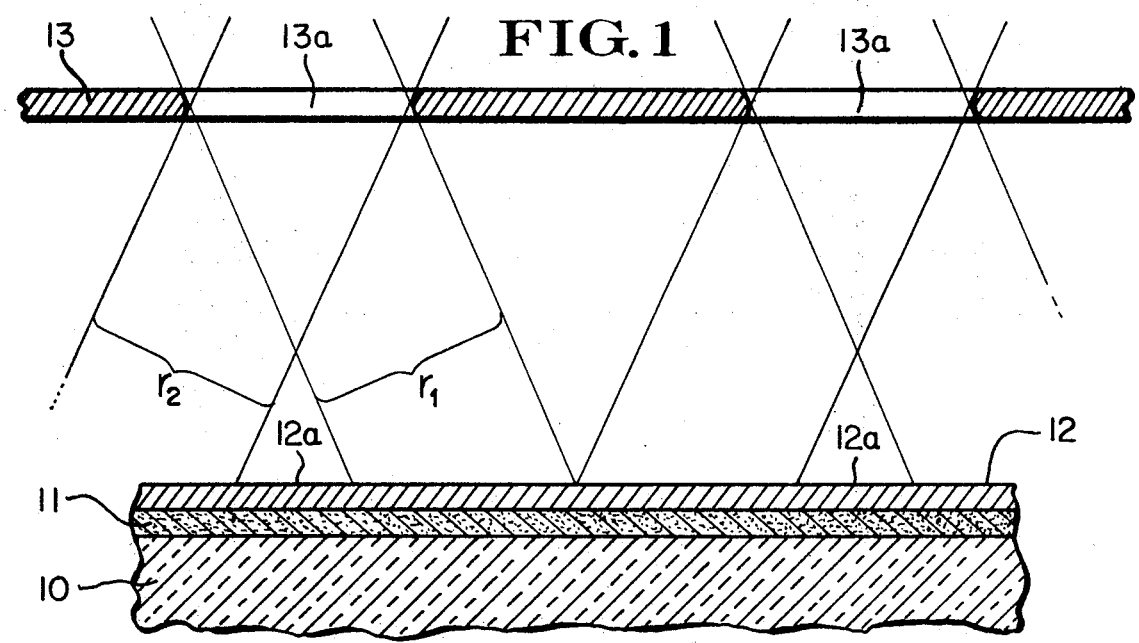
FIGS. 1 to 4 represent various stages of the screening process of the subject invention.

After light-absorbing layer 11 has been applied and dried, it is overcoated with a layer 12 of a photosensitive material of such nature that it may be rendered insoluble in a predetermined solvent in response to exposure to actinic energy. For the specific embodiment under consideration, a suitable material is a solution of polyvinyl alcohol and ammonium dichromate in water. It is certainly desirable that layer 11 be unaffected by the ingredients of overcoat 12 and it is preferred that neither layer react upon the other; the solvent of one preferably does not attack ingredients of the other. It is convenient to use polyvinyl alcohol because it is easily exposed and rendered insoluble to water by ultraviolet light which is typically employed in screening color tubes of the type under consideration. Accordingly, faceplate 10, bearing light-absorbing layer 11 and the overcoat 12 is first associated with its shadow mask and then positioned for exposure in the usual exposure chamber or lighthouse. The light source is positioned to represent or simulate the electron gun of the tube in question that is assigned to excite phosphor deposits of a particular color, such as green. It will be assumed that the light source is annular in configuration and the result of exposing it is indicated in FIG. 1 where the mask is symbolically represented at 13 having apertures 13a through which light from a ring source (not shown) has access to coated faceplate 10. The light rays through one such aperture are designated $r_1$ and $r_2$, indicating that a ring of layer 12 is exposed, leaving a dot segment 12a unexposed.

It should be noted in passing that exposing with an annulus of light will, per force of the geometry of the installation, tend to cause elliptical distortion of the unexposed dot 12a of layer 12 in an amount which increases with distance from the center of the substrate to a maximum distortion at the edges of the screen. This may be substantially avoided by using an exposing arrangement of the type described and claimed in applicant's copending application, Ser. No. 755,156 filed Aug. 26, 1968 and assigned to the assignee of the present invention.

Figure 2:
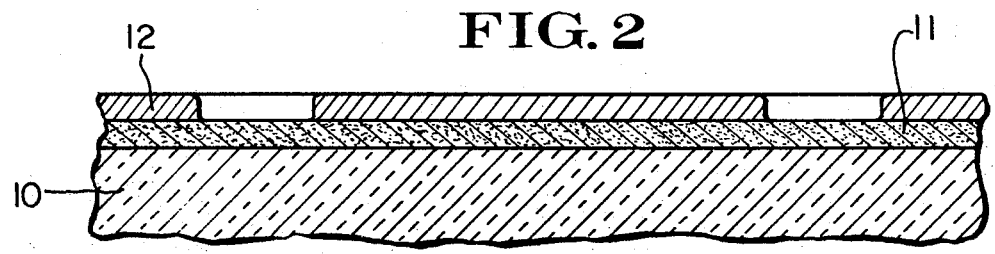
Figure 3:
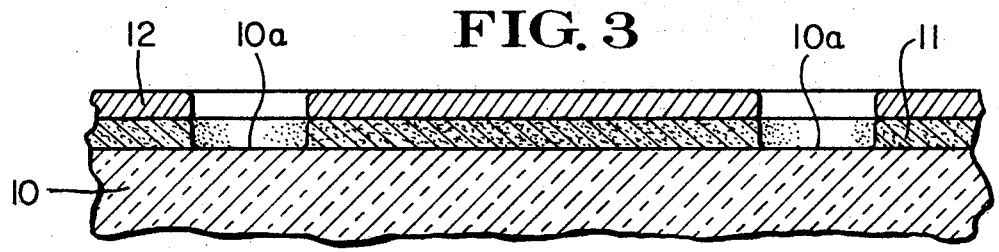

Following this exposure, the faceplate is treated with the solvent of photosensitive layer 12, specifically water, as by rinsing or washing. This is a well-known developing step which removes the unexposed portions 12a of layer 12 which overlie those elemental areas of faceplate 10 that are assigned to one color, green for the assumed process. The exposed portions of the layer, however, remain in place simply because the exposure has rendered them insoluble in water. The developed photosensitive layer is represented in FIG. 2, showing that portions 12a have been removed. As a consequence of rinsing with water and removing portions 12a of the photosensitive overcoat, the portions of layer 11 that overlie elemental areas of the screen assigned to green phosphor are uncovered and the next step is the removal of such uncovered portions of layer 11. Here again these portions of light-absorbing layer are readily removed by treating the coated faceplate with toluene, the solvent of layer 11. The condition of FIG. 3 results. Elemental portions have been removed from both photosensitive layer 12 and light-absorbing layer 11 which exposes or lays bare portions 10a of faceplate 10 which are assigned to receive green phosphor. The next step is stripping the exposed portions of layer 12 and this may be achieved by washing with a caustic solution such as weak sodium hydroxide. Polyvinyl alcohol may also be removed by heat although care must be taken that the stripping technique adopted does not adversely effect the residue of light-absorbing layer 11.

Figure 4:
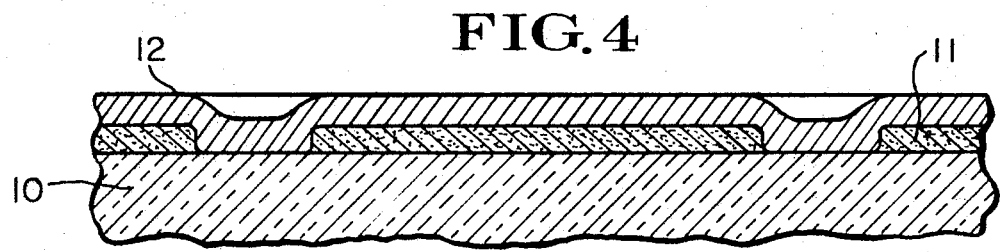

It is necessary to repeat most of the above-described process steps in order to remove those portions of light-absorbing layer 11 which overlie the elemental areas of substrate 10 that are to receive blue and red phosphor material. The first step to be repeated, as indicated in FIG. 4, is the reapplication of photosensitive layer 12 and all of the other steps are repeated in order to expose those parts of faceplate 10 that are to receive blue phosphor. In precisely the same way, one may expose the small areas of the faceplate that are assigned to red. Of course, the position of the light source must be properly adjusted in carrying out the process steps to eliminate portions of layer 11 that otherwise cover elemental areas of screen 10 assigned to these phosphor materials. Having accomplished this removal of those portions of light-absorbing layer 11 that otherwise cover the elemental areas of faceplate 10 that are to receive phosphor material, such material may be deposited in any of the known processes such as slurry screening, dusting or by electrophotographic deposition.

Certain advantages manifest themselves from a study of the described process. For example, the use of an annular-shaped exposure light source is a convenient way of dimensioning unexposed portions 12a of the photosensitive layer to be smaller in size than aperture 13a of the shadow mask which is a necessary condition for optimum practicing of black surround techniques. Of course, since the phosphor dot dimensions are derived directly from portions 12a of layer 12, the phosphor dots have a desired size in relation to the openings of shadow mask 13.

It is further apparent that critical dimensioning of the phosphor deposits is avoided by applying light-absorbing layer 11 before establishing the phosphor dots. In fact, the dots may be of such size that they become tangent to one another but only the phosphor which is deposited in the voids of light-absorbing layer 11 are effective. The remainder of the phosphor deposits overlying the black surround or light-absorbing material 11 is of no consequence. Thus, in relation to the viewing side of the screen the formed screen has a multiplicity of interleaved deposits of red, green and blue phosphors which are separated from one another by light-absorbing black surround material.

Moreover, the system makes use of relatively inexpensive photosensitive materials e.g., those which become insoluble upon exposure to ultraviolet, as distinguished from the opposite type which becomes soluble upon exposure.

In one variant of the described process, the exposed portions of the photosensitive layer of the third phosphor material are not removed before the phosphor materials are put down. In such a case, and assuming that red is the color assigned to the last use of the sequence of steps represented in FIGS. 1 through 4, the green and blue phosphors will actually be deposited on top of exposed polyvinyl alcohol, remaining from the sequence of steps that were used in exposing the areas of the screen assigned to red. Depositing blue and green phosphors on the polyvinyl alcohol layer is no particular detriment since the polyvinyl alcohol will be removed in the usual baking step to which the faceplate is subjected after the various phosphors have been applied to it.

The described process is of course not restricted to the materials mentioned in the discussion of FIGS. 1 to 4. They are merely representative of one application of the invention and other materials may be used so long as the process steps recited may be accomplished.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In the manufacture of a color image reproducing device having a spherically shaped screen and having a color-selection electrode comprised of a mask having a field of circular apertures, the method of forming on said screen a multiplicity of interleaved sets of dot-shaped deposits of different phosphor materials that are separated from one another by light-absorbing material, and are smaller in size than said apertures of said mask which method comprises the following steps:

a. coating the inner surface of said screen with a layer of material which has the capability of substantially absorbing ambient light and which is soluble in a first predetermined solvent;

b. applying thereover a layer of photosensitive material which is insoluble in said first solvent and which may be rendered insoluble in a second predetermined solvent in response to exposure to actinic energy;

c. exposing said photosensitive layer to actinic energy directed from a source through the apertures of said electrode to said photosensitive layer except the portions which overlie elemental areas of said screen assigned to a particular one of said phosphor materials and which are smaller in area than said apertures of said mask;

d. treating said screen with said second solvent to remove the unexposed portions of said photosensitive layer and to uncover the portions of said layer of light-absorbing coating that overlie said elemental areas of said screen;

e. treating said screen with said first solvent to remove said uncovered portions of said layer of light-absorbing coating;

f. stripping said exposed portions of said photosensitive layer from said screen;

g. repeating the sequence of steps (b) through (f) for each of the remaining phosphor materials, except for the final phosphor material, but modified to leave unexposed in each such sequence the portions of said photosensitive layer overlying elemental areas of said screen assigned to another one of said phosphor materials;

h. repeating the sequence of at least steps (b) through (e) for said final phosphor material but modified to leave unexposed the portions of said photosensitive layer overlying elemental areas of said screen assigned to said final phosphor material;

i. and depositing said phosphor materials in the respectively assigned elemental areas of said screen.

2. The method in accordance with claim 1 in which:
the sequence of steps (b) through (f) is performed for each of said phosphor materials.

3. The method in accordance with claim 1 in which said light-absorbing layer is formed of a composition including an ingredient that has light-absorbing capabilities, an acrylic resin binder and a solvent for said binder;
and in which step (e) comprises treating said screen with said solvent for said binder.

4. The method in accordance with claim 3 in which said ingredient of said light absorbing layer is manganous carbonate;
and in which, following step (i), said screen is subjected to a heat treatment to convert said manganous carbonate to manganese dioxide.

5. The method in accordance with claim 3 in which said light-absorbing layer is insoluble in said solvent for said photosensitive layer;
and in which said exposed photosensitive layer is insoluble in said solvent for said binder of said light-absorbing layer.

6. The method in accordance with claim 1 in which said phosphor materials are deposited by photographic printing employing said electrode as an image-defining pattern in the application of each of said phosphors.

7. In the manufacture of a color image reproducing device having a spherically shaped screen and having a color-selection electrode comprised of a mask having a field of circular apertures, the method of forming on said screen a multiplicity of interleaved sets of dot-shaped deposits of different phosphor materials that are separated from one another by light-absorbing material and are smaller in size than said apertures of said masks, which method comprises the following steps:

a. coating the inner surface of said screen with a layer of material which has the capability of substantially absorbing ambient light and which is soluble in a first predetermined solvent;

b. applying thereover a layer of photosensitive material which is insoluble in said first solvent and which may be rendered insoluble in a second predetermined solvent in response to exposure to actinic energy;

c. directing actinic energy from a source through the apertures of said electrode to expose and insolubilize a series of ring-shaped portions of said photosensitive layer individually enclosing an unexposed elemental area which is smaller in size than the apertures of said electrode and which overlays a corresponding elemental area of said screen assigned to a particular one of said phosphor materials;

d. treating said screen with said second solvent to remove said unexposed portions of said photosensitive layer and to uncover the portions of said layer of light-absorbing coating that overlay said corresponding elemental areas of said screen;

e. treating said screen with said first solvent to remove said uncovered portions of said layer of light-absorbing coating;

f. stripping said exposed portions of said photosensitive layer from said screen; and g. repeating the sequence of steps (b) through (f) for remaining ones of said phosphor materials but with the position of said source modified to leave unexposed in each such sequence the portions of said photosensitive layer overlaying elemental areas of said screen assigned to another one of said phosphor materials.